Nov. 15, 1927.　　　　　　　　　　　　　　　　　　　　　1,649,242

B. E. LLOYD

SOUND PRODUCING DEVICE

Filed Nov. 25, 1922　　　　　　　　　　　　2 Sheets-Sheet 1

WITNESSES

INVENTOR
Burt E. Lloyd
BY
ATTORNEYS

Nov. 15, 1927.

B. E. LLOYD 1,649,242

SOUND PRODUCING DEVICE

Filed Nov. 25, 1922     2 Sheets-Sheet 2

INVENTOR
Burt E. Lloyd
BY
ATTORNEYS

Patented Nov. 15, 1927.

UNITED STATES PATENT OFFICE.

BURT E. LLOYD, OF WEST NEW YORK, NEW JERSEY, ASSIGNOR TO VOICES INCORPORATED, A CORPORATION OF DELAWARE.

SOUND-PRODUCING DEVICE.

Application filed November 25, 1922. Serial No. 603,259.

This invention relates to sound producing devices and more particularly to a device capable of incorporation with a doll structure either resembling human beings or animals and has for an object to provide a simple construction which will accomplish the desired result of producing proper sounds while being protected in an enclosing casing.

Another object of the invention is to provide a sound producing device for dolls and the like wherein a weighted bellows is used and a stiff rod or guiding member adapted to co-act with the weight to actuate articulating means.

A further object of the invention is to provide a sounding device for toys and the like which is of a minimum length with a maximum throw for the bellows used therein.

A still further object of the invention is to provide a sound producing device in which a single weighted bellows is utilized to produce or for operating reeds or other sounding mediums either at one or two ends of the device.

This application is a continuing application in part of my co-pending application, Serial No. 518,598, entitled "Voice for toys."

In the accompanying drawings—

Figure 3:
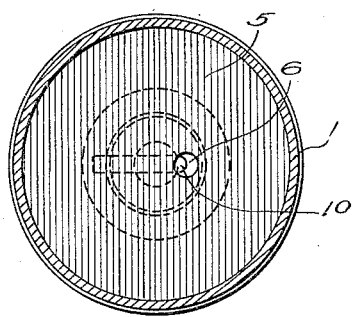
Figure 3 is a transverse sectional view through Figure 1 approximately on line 3—3.
Figure 4:
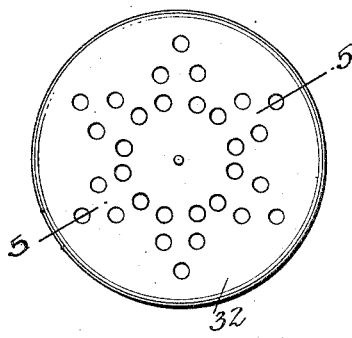
Figure 4 is a top plan view of a slightly modified construction to that illustrated in Figure 1.

Referring to the accompanying drawings by numeral, 1 indicates a tube or casing of any desired material which is preferably round in cross section as shown in Figure 3. This tube is of such a length as to enclose all of the mechanism or moving parts of the device whereby when it is incorporated into an effigy or doll of any kind, the parts of the doll will not interfere with the proper operation of the device. A rather porous cloth or foraminous member 2 is connected to one end of the casing 1 by an adhesive or other means so as to prevent the entrance of any objectionable matter but to allow the sound to freely escape. The opposite end of the casing 1 is provided with a cap 3 which may be held in place by friction, said cap having one or more apertures 4 to allow the free escape of sound. Near the cap 2 is arranged a transverse wall or partition 5 secured to the casing 1 by adhesive or other means, said partition having an aperture 6 so that air may discharge from the chamber 7 into the chamber 8 formed by the auxiliary cap 9. The chamber 8 carries a reed tube 10 and a reed 11 whereby air passing through the opening 6 and from thence through the reed tube out through opening 4 will cause the reed 11 to vibrate to produce the desired sound. Where the device is used in a doll, the tone of the reed is selected so as to imitate as near as possible the crying of a child.

Arranged at a distance from the partition 5 is a second partition 12 which is provided with apertures 13 and 14, aperture 13 acting merely as an air vent while aperture 14 acts as an air vent and also as an opening for accommodating the rod or stem 15 which is preferably of some stiff material, as for instance, metal. The rod or stem 15 at the end opposite that extending through the aperture 14, is provided with disks 16 and 17 which may be of any desired material and which co-act with the flexible member 18 and the sounding device 19 to produce a sound which simulates the word "Ma-ma." The flexible member 18 is preferably of thin rubber and is provided with an aperture of a diameter less than the diameter of the disks 16 and 17 so that lips 20 will be provided, said lips, of course, flexing as the disks 16 and 17 pass the member 18. The sounding member 19 is similar to that shown at the opposite end of the casing and consists of a reed tube and reed arranged to extend from the chamber 21 into the chamber 22.

It will be noted that the chamber 22 is formed principally by the tubular member 23, division plate 24 and a division wall 25. The division wall 25 is provided with an aperture 26 for the stem 15 and also with a comparatively large aperture 27 for the passage of air into the chamber 21 and from thence through the sounding device 19. A bellows 28 is secured at one end to the division wall 25 or to the casing 1 near the division wall and also to a weight 29. The weight 29 is rigidly secured to the stem 15 so that as the weight moves back and forth it will reciprocate the stem 15 and cause the disks 16 and 17 to pass back and forth through the member 18.

Figure 1:
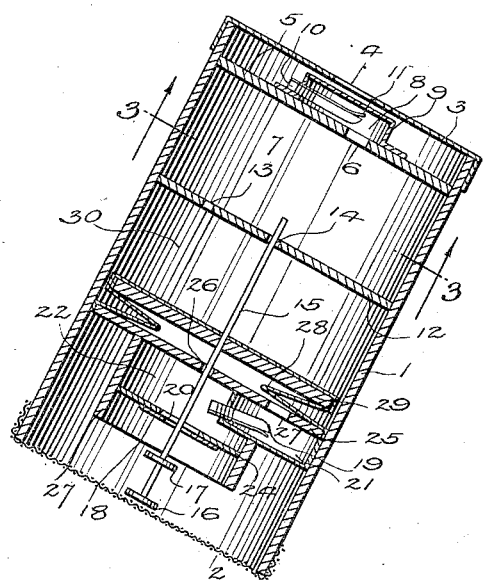
Figure 1 is a longitudinal sectional view through a device embodying the invention, the same being shown in a partially inverted position for illustrating the bellows and other parts in their operated position.
Figure 2:
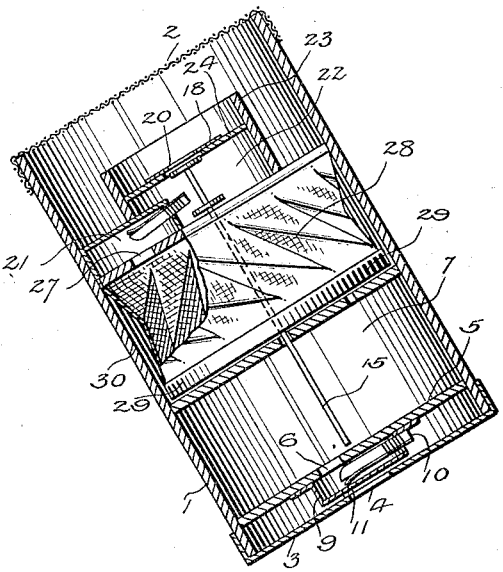
Figure 2 is a view similar to Figure 1 but showing the device in the opposite position to that illustrated in Figure 1 whereby the bellows is distended.

When the parts are in the position shown in Figure 1 and the device is inverted or moved to substantially the position shown in Figure 2, the bellows 28 will distend by reason of the action of the weight 29 which is operated by gravity. The movement of the weight 29 toward the division wall 12 causes the air in the chamber 30 to be forced through the openings 13 and 14 into chamber 7 and from thence out the aperture 6 so that the reed 11 will be operated and produce a desired sound. While this is taking place, the disks 16 and 17 will be moving into the chamber 22 ready to produce the desired articulation when the device is again inverted to substantially the position shown in Figure 1. When this movement is carried out, the weight 29 will collapse the bellows and cause the air to be expelled through the opening 27. This will not only operate the reed of the sounding device 19 but will cause the disks 16 and 17 to successively pass the lips 20 and thereby successively shut off the air so as to produce the desired articulation. As the disk 16 passes the lips 20, the sound "Ma" will be produced and a little later a second sound "Ma" will be produced as the disk 17 passes through the lips. This gives a sound very similar to a small child calling for its mother.

When the device is turned as shown in Figure 2, sound will be produced which is intended to resemble the crying of a child and when the device is turned to the position shown in Figure 1 the device is caused to cry or say "Ma-ma."

In Figures 4 to 7 inclusive, a slightly modified construction is shown which is comparatively short in respect to the structure shown in Figure 1. This is designed particularly for smaller dolls and is intended for to provide means similar to that shown in Figure 1 for saying "Ma-ma." Referring to these figures particularly, 31 is the casing which is preferably round and which is provided with a cap 32 at one end, said cap being held in place by friction or in any desired manner. A central aperture is provided in cap 32 for receiving the reduced end 33 of the stem or guide 34. The cap 32 is provided with a number of apertures 35 for permitting the air to escape or to enter, said apertures being arranged as a star (Figure 4) though they could be otherwise arranged without departing from the invention. The stem or guide 34 is held stationary in respect to the casing 31 by having the end 36 flattened after it has passed through the eyelet 37, said eyelet being secured to the end disk 38. This disk may be held in place in any desired manner but preferably by having the end flattened or enlarged.

Figure 5:
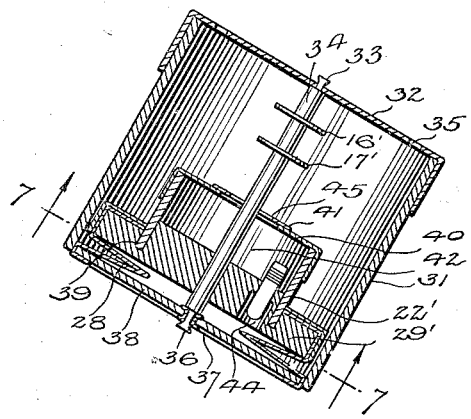
Figure 5 is a sectional view through Figure 4 approximately on line 5—5.
Figure 6:
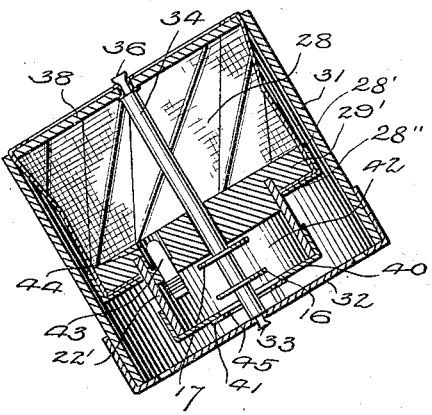
Figure 6 is a view similar to Figure 5 but in an inverted position.
Figure 7:
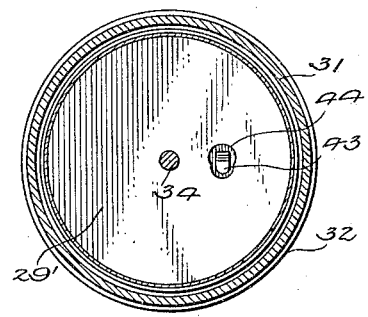
Figure 7 is a sectional view through Figure 5 approximately on line 7—7.

The bellows 28 is secured at one end to the disk 38 and at the other end to the weight 29', which weight is provided with a comparatively deep groove 39 for receiving the tubular member 22', which tubular member with the cap 40 and the resilient disk 41, form a chamber 42. The end of the bellows may be secured to the weight in a number of different ways but it is preferably folded thereover as illustrated in Figures 5 and 6 and pinched in place by a metallic ring 28'. If desired, this ring may have an overhanging flange 28" which consists in holding the end of the bellows in place and also acts to stiffen the ring as well as permit a ready application of the ring during the manufacture of the device. The weight 29' closes one end of the chamber except for the part occupied by the sounding device 43, which sounding device is similar to that shown in Figure 1 and consists of a reed tube and reed. It will be noted that one end of the sounding device 43 extends into the chamber 42 and the other into an enlarged bore 44 in the weight 29'. The rubber disk or member 41 is provided with a central aperture whereby lips 45 are formed similar to the lips 22, which lips co-act with the disks 16' and 17'.

When the parts are in the position shown in Figure 1, the bellows 28 is collapsed but when the parts are turned to the position shown in Figure 6, the weight 29' will distend the bellows and will move the member 41 past the disks 16' and 17'. As the sounding member 43 is not set to produce a sound when the bellows is distending, there will be no sound produced but when the device is turned from the position shown in Figure 6 back to the position shown in Figure 5, the weight 29' will collapse the bellows and a sound will be produced. As the sound is being produced, the lips 45 will be moving successively past the disks 16' and 17' for producing successive articulations so that the device will enunciate the word "Ma-ma." In this form of the invention it will be noted that the lips move past the disks rather than the disks move past the lips. It will also be noted that the stem or guide 34 is stiff or rigid and may be made from any suitable material, as for instance, metal, and that the weight 29' slides over the stem instead of moving the stem.

It will be understood that the forms in the drawing are only examples of the invention chosen for the purpose of illustration and description. The invention consists primarily of a tubular bellows member attached at one end to a stationary head, and at its other end to a movable head, in combination with a reed or equivalent sounding element carried by one of said heads and a non-flexing member mounted upon one head and piercing the other head, with a clearance sufficient to permit free movement between the pierced head and the member and to guide said movable head and steady the bellows throughout its range of movements. To complete the operative structure, the movable head is weighted, for instance, by being provided with a weight of such proportions and heaviness as to operate the bellows by gravity alone and to compel its collapse unaided by any other means, said weight being, however, light enough to be retarded in its descent by the air in the collapsing bellows, so that, although the collapse is positive, it is gradual and relatively slow, whereby the desired sound effects are produced in a reliable and efficient manner. In the preferred form, the single bellows is arranged to alternately operate devices whereby sounds of different predetermined characteristics are produced in simulation of natural sounds peculiar to the original of the toy effigy in which the sound producing device is incorporated. It will, therefore, be noted that there is provided a double acting sound producer for toys having a body with perforated disks forming a bellows chamber in the body. It will also be noted that there are arranged reed boxes over the perforations in the disks with lips on said reed and means for articulating the sound coming from the lips of one of said reeds.

When the flexible lip comes in engagement with one of the disks 16 or 17 the lip momentarily hangs on the disk whereby the sound escape opening is closed by the snug fit of the lip around the disk and by the same relation of the disk and lip the movement of the weight is momentarily retarded. The closure of the sound escape opening and the slight retardation of the movement of the weight causes interruption in compression of the air within the bellows chamber and as the weight continues its movement the rubber lip quickly snaps from the disk to open the sound escape opening and permit the escape of sound and the resumption of normal movement of the weight.

What I claim is:—

1. A sound producing device for toys and the like comprising a casing, a weighty air compression head in said casing moving backwardly and forwardly by gravity within said casing, a sound producing means adapted to be operated by the flow of air caused by the movement of said weighty air compression head in one direction, and means for interrupting the sound produced by said sound producing means whereby a plurality of sounds will issue from the sound producing device during one movement of said weighty air compression head and means to guide the weighty air compression head during its backward and forward movement.

2. A sounding device for toys and the like comprising a casing, a weighty compression member within the casing adapted to reciprocate by gravity within the casing, sound producing means operated by the air under pressure of said compression member and means to prevent any substantial tilting of said weighty compression member during the movement thereof.

3. A sound producing device for toys and the like comprising a tubular casing, a weighty head adapted to slide by gravity back and forth in the casing, a sounding means operated by movement of said head, and means to guide said weighty head during its reciprocation and prevent any substantial tilting of said weighty head during the backward and forward movement thereof.

4. A sound producing device for toys and the like comprising a tubular casing, a weighty head adapted to slide by gravity back and forth in the casing, sounding means operated by the sliding movement of said head, means to guide the weighty head during its sliding movement, and means whereby the sound from said sounding means is interrupted during one movement of the weighty head whereby a plurality of sounds will issue from the sounding means during one movement of the weighty head.

5. A sound producing device comprising a tubular casing, a weighty compression member adapted to reciprocate in said casing, said weighty compression member extending across the interior of said casing and occupying substantially the entire cross sectional area thereof, sound producing means adapted to be actuated by the compression of air under the influence of said compression member, a sound escape opening, means to articulate the sound escaping from said sound escape opening and guiding means to prevent tilting of the compression member during its reciprocation.

6. An automatic sound producing device, adapted to be operated by tilting, comprising a casing, a weighty compression member adapted to reciprocate in the casing, sounding means operated, by the movement of air therethrough, under pressure of the weighty compression member and means operated by the movement of the weight to articulate the sound produced by the sounding member and means to guide the compression member during movement.

7. A sound producing device comprising a casing, a weighty compression member adapted to reciprocate in the casing, means to guide the compression member during movement thereof, a sound producing device actuated by the air expelled under the influence of said compression member, a sound escape opening through which the sound produced by the sound producing device escapes, and means to interrupt the sound escaping from said sound escape opening, said means comprising a flexible member and spaced abutments lying in the path of movement of said flexible member, said flexible member being adapted to engage said abutments successively and to yield to permit it to pass said abutments under the influence of the said compression member.

8. A sound producing device comprising a casing, a weighty compression member adapted to reciprocate in the casing, means to guide the compression member during movement thereof, a sound producing device actuated by the air expelled under the influence of said compression member, a sound escape opening through which the sound produced by the sound producing device escapes, and means to interrupt the sound escaping from said sound escape opening, said means comprising cooperating elements, one of said elements being resilient and adapted to engage the other element and to have its edge put under tension while the said elements are in engagement and then quickly snapping from said cooperating element whereby the sound escape opening is opened.

9. A sound producing device comprising a casing, an air compression chamber in said casing, a guided weighty compression member adapted to reciprocate in said casing, sounding means having communication with the interior of said compression chamber through an opening therein, a sound receiving chamber adapted to receive sound from said sounding means, a sound escape opening in said sound receiving chamber and means to articulate the sound escaping from said sound escape opening.

10. A sound producing device comprising a tubular casing, a bellows having an end thereof secured to the walls of the casing, a weighty reciprocating compression member carrying the other end of said bellows, said compression member being gravity actuated in both directions and a sounding element actuated by the air forced therethrough during a stroke of said compression member and means to guide the compression member during reciprocation.

11. A sound producing device comprising a tubular casing, a guided weighty reciprocating compression member, having a circular periphery, within the casing, said compression member being gravity actuated, a sounding element actuated by the air forced therethrough by said reciprocating compression member during a stroke thereof, a sound escape opening and means to open and close the sound escape opening whereby the sound escaping therefrom is articulated.

12. A sound producing device comprising spaced members fixedly connected, a bellows positioned between said members, an air compression member carried by one end of said bellows and adapted to reciprocate by gravity between said spaced members, a sound producing device actuated by the air expelled from said bellows, and means to guide said compression member during reciprocation.

13. In a sound producing device, a casing, a sound producer, an air compression member within the casing adapted to move by gravity back and forth within said casing and adapted to force air through said sound producer, said air compression member having a part operatively coacting with a part of the casing to guide it during its back and forth movement to prevent any substantial tilting thereof.

14. A sounding device for toys and the like comprising a casing having an air chamber, a weighty member within the casing adapted to reciprocate by gravity to cause a flow of air into and out of said chamber, sound producing means operated by the flow of air in the gravity movement of said member in one direction, and means restraining said weighty member against movement in an angular direction relative to the direction of its gravity movement.

15. An automatic sound producing device adapted to be operated by tilting, comprising a casing, an air compression member adapted to reciprocate in the casing, sounding means operated by the movement of air therethrough upon reciprocation of said member, means operatively controlled by said member to articulate the sound produced by the sounding means, and means to guide the compression member during movement.

16. In a sound producing device, a sounding reed, an air receiving chamber, a member constituting an end wall of said chamber and rectilinearly movable towards and from the other end wall of said chamber to effect the passage of air through said reed, means guiding said member in its rectilinear movement, and means cooperating with the guide means to effect an articulated emission of sound produced by said reed.

17. In a sound producing device, an air compressing member adapted to reciprocate within the casing between the ends thereof, a reed through which the air is expelled, a sound controlling element carried by the air compressing member, a second sound controlling element cooperating with the first and said second sound controlling element having one portion of it in fixed relation to a portion of the casing and another portion of said sound controlling element adapted to frictionally engage with the first sound controlling element and move therewith for a limited space, the frictional engagement between the two sound controlling elements retarding the movement of the air expelling member during the time of their frictional engagement and such frictional engagement when overcome by the weight of the air expelling member resulting in accelerated movement of the air expelling member and a sudden return of the free portion of the second sound controlling element to its normal position.

18. In a sound producing device, a casing having a head at each end thereof, a sound emission opening in one wall of the casing, a sounding reed within the casing, a gravity operating compression member adapted to reciprocate within the casing and during one movement thereof forcing air through said reed and means cooperating with said member to retard the movement thereof to interrupt the sound produced by the sounding reed.

19. A sound producing device comprising a casing, a flexible tubular bellows within said casing and having an end thereof secured in fixed position with relation to an end of said casing, the opposite end of said bellows being weighted but free to reciprocate within said casing, said weighted end having free relative movement toward and away from said fixed end, a stiff guide positioned at right angles to the weighted end of said bellows, said guide arranged to prevent any substantial axial tilting of said weighted end of said bellows within said casing during its movement therein, the bellows during its extended position encompassing a substantial portion of said guide, a fixed member extending across the casing and adapted to retain the said guide in its position relative to the path of movement of the weighted end of the bellows, a sound producing device communicating with the interior of said bellows and adapted to be sounded by the air expelled from within said bellows as the weighted end moves toward the fixed end thereof.

20. In a sound producing device, a casing, a closure at each end thereof, a gravity operating weight in the casing adapted to reciprocate when the casing is slightly inclined, at alternate angles from the horizontal, a reed, an air chamber adapted to have the air therein forced through said reed during gravity movement of the weight in one direction, a sound escape opening and means to interrupt the sound escaping therefrom as the weight forces air through said sound escape opening.

BURT E. LLOYD.